United States Patent [19]

Krashkevich et al.

[11] Patent Number: 5,039,631
[45] Date of Patent: Aug. 13, 1991

[54] STRENGTHENABLE, HIGH NON-ND LANTHANOID-CONTAINING GLASSES

[75] Inventors: David Krashkevich; Yuiko T. Hayden, both of Duryea, Pa.

[73] Assignee: Schott Glass Technologies, Inc., Duryea, Pa.

[21] Appl. No.: 463,225

[22] Filed: Jan. 11, 1990

[51] Int. Cl.$^5$ .................. C03C 3/21; C03C 3/095; C03C 3/068; C03C 3/066
[52] U.S. Cl. ........................... 501/64; 501/11; 501/46; 501/60; 501/62; 501/65; 501/78; 501/79; 313/110; 313/116; 313/480
[58] Field of Search ................. 501/4, 11, 13, 46, 64, 501/65, 78, 79; 313/110, 114, 116

[56] References Cited

U.S. PATENT DOCUMENTS

| | | |
|---|---|---|
| 3,357,876 | 12/1967 | Rinehart . |
| 3,947,281 | 3/1976 | Bacon . |
| 3,997,249 | 12/1976 | Krohn et al. . |
| 4,012,131 | 3/1977 | Krohn et al. . |
| 4,022,628 | 5/1977 | Deeg . |
| 4,036,623 | 7/1977 | Deeg et al. . |
| 4,248,732 | 2/1981 | Myers et al. ................ 252/301.6 P |
| 4,288,250 | 9/1981 | Yamashita . |
| 4,376,829 | 3/1983 | Daiku . |
| 4,390,637 | 6/1983 | Daiku . |
| 4,521,524 | 6/1985 | Yamashita . |
| 4,769,347 | 6/1988 | Cook et al. . |
| 4,798,768 | 1/1989 | Oversluizen et al. ............... 428/426 |
| 4,891,336 | 1/1990 | Prassas ................................. 501/13 |

OTHER PUBLICATIONS

W. D. Kingery et al., "Introduction to Ceramics", second edition, 1976, 841–844.
J. S. Stroud Glass Technology, vol. 29, No. 3, Jun. 1988, 108–114.

Primary Examiner—William R. Dixon, Jr.
Assistant Examiner—Michael Marcheschi
Attorney, Agent, or Firm—Millen, White & Zelano

[57] ABSTRACT

A strengthened high lanthanide-containing glass has the composition of, in mole percent

| | |
|---|---|
| $SiO_2$ | 54–75 |
| $B_2O_3$ | 5–17 |
| $Li_2O$ | 0–4 |
| $Na_2O$ | 3–18 |
| $K_2O$ | 0–4 |
| $Al_2O_3$ | 0–7 |
| PbO | 0–4 |
| MgO | 0–3 |
| CaO | 0–3 |
| SrO | 0–3 |
| BaO | 0–3 |
| ZnO | 0.1–10 |
| $TiO_2$ | 0–5 |
| $Ln_2O_3$ | 3–7 |
| $V_2O_5 + Cr_2O_3 + Mn_2O_3$ | 0–5 |
| $Fe_2O_3 + CoO + NiO + CuO$ | |
| $As_2O_3/Sb_2O_3$ | 0–0.4 | wherein Ln is La, Ce, Pr, Sm, Eu, Gd, Tb, Dy, Ho, Er, Tm and/or Yb.

36 Claims, No Drawings

STRENGTHENABLE, HIGH NON-ND LANTHANOID-CONTAINING GLASSES

CROSS-REFERENCE TO RELATED APPLICATION

This application is related to U.S. patent application Ser. No. 07/463,226, which is entirely incorporated by reference herein.

BACKGROUND OF THE INVENTION

This invention relates to strengthenable glasses having a high non-Nd lanthanoid content.

In the mentioned related application, a description is given of a surprising glass composition which provides chemically and physically strengthenable glasses having a high neodymium oxide content. It has now been established that the base glass composition of the mentioned related application is applicable to other lanthanoids, thereby providing new useful glasses.

SUMMARY OF THE INVENTION

This invention thus provides glass compositions which are chemically and physically strengthenable, despite a high content of a lanthanoid other than neodymium oxide. As a result, this invention provides very useful base glass compositions for high lanthanoid filter glasses, for example, those used in laser systems where strengthened glass is desired to offset the effects of laser induced joule heating of the optical component.

Prior to the mentioned discovery, various glasses were known having relatively high lanthanide oxide contents. For example, the following United States patents disclose glasses having amounts of neodymium which can exceed about 10 weight percent: U.S. Pat. Nos. 4,521,524 (contrast enhancement filters); 4,288,250 (contrast enhancement filters); 4,769,347 (contrast enhancement filters); and 3,947,281 (high modulus glasses). Also known are glasses having contents up to about 10 weight percent of neodymium such as U.S. Pat. Nos. 4,376,829 (cathode ray tube glass) and 4,390,637 (cathode ray tube glass). However, no discussion of strengthenability of these glasses is given.

Of course, strengthening of glasses per se has long been known for various glasses such as crown glasses. See, e.g., J. S. Stroud Glass Technology, Vol. 29, No. 3, June 1988, 108-114, and U.S. Pat. Nos. 4,036,623; 4,022,628; and 4,012,131, where ZnO is used to enhance chemstrengthening in conventional ophthalmic glasses. Chemstrengthenability of a glass containing 15-35 weight percent of $La_2O_3$ is also known (U.S. Pat. No. 3,997,249).

However, a need exists for development of a high lanthanide oxide-containing glass which is satisfactorily strengthenable, chemically or physically.

This invention relates to high lanthanoid (other than Nd) containing glasses, e.g., for ophthalmic applications, which have an excellent capability for chemical strengthening and physical strengthening.

Thus, in one aspect, this invention relates to a glass composition having the following components:

TABLE 1

| Compositions in Mole Percent | | | |
|---|---|---|---|
| | General | Preferred | Most Preferred |
| $SiO_2$ | 54-75 | 60-70 | 65-70 |
| $B_2O_3$ | 5-17 | 5-10 | 6-9 |
| $Li_2O$ | 0-4 | 0-3.5 | 0-3 |
| $Na_2O$ | 3-18 | 10-18 | 15-17 |
| $K_2O$ | 0-4 | 0-3.5 | 0-3 |
| $Al_2O_3$ | 0-7 | 0 | 0 |
| PbO | 0-4 | 0 | 0 |
| MgO | 0-3 | 0 | 0 |
| CaO | 0-3 | 0 | 0 |
| SrO | 0-3 | 0 | 0 |
| BaO | 0-3 | 0 | 0 |
| ZnO | 0.1-10 | 1-7 | 2-5 |
| $TiO_2$ | 0-5 | 0 | 0 |
| $Ln_2O_3$ | 3-7 | 4-7 | 5-7 |
| $V_2O_5 + Cr_2O_3 + Mn_2O_3$ $Fe_2O_3 + CoO + NiO + CuO$ | 0-5 | 0 | 0 |
| $As_2O_3/Sb_2O_3$ | 0-0.4 | 0-0.2 | 0-0.2 | wherein Ln is La, Ce, Pr, Sm, Eu, Gd, Tb, Dy, Ho, Er, Tm and/or Yb.

This glass is useful for all applications wherein a high-lanthanoid content glass is useful, e.g., as a filter glass, for, e.g., laser optics, contrast enhancement, eyeglass applications, sunglass lenses, laser cavity filters, etc.

In another aspect, this invention relates to a glass having the composition given above, wherein Ln is not Ce, except also containing an amount of $CeO_2$ in the range of 0-3 mole %, preferably in the range of 0-2 mole %, and most preferably in the range of 0-1.5 mole %. Such glasses, for example, are useful as UV-attenuated glasses as filters for the visible and near infrared regions. (Ce can attenuate UV alone or in combination with Pb and/or Ti.) In addition, $CeO_2$ can serve as a solarization inhibitor or a refining agent. This invention also relates in general to glasses having 0-3 $CeO_2$.

As also discussed below, the glasses can optionally contain coloring-effective amounts of conventional colorants, whereby the glasses can be employed as color enhancement filters also, e.g., as filters for the visible region.

The strengthenability of the glasses of this invention is achieved very advantageously, despite the high lanthanide contents by the compositional features, for example, regarding inclusion of ZnO and $Na_2O$, and exclusion of $K_2O$, inter alia.

If the amount of sodium oxide is less than 3 weight percent, then unsatisfactory strengthening, especially chemical strengthening, will be obtained. If the amount of sodium oxide is greater than 18 weight percent, devitrification increases. Also, the resultant melt can unacceptably attack the refractory material of the melt tank. Other end point mole % amounts for the sodium oxide range are 3, 4, 5, 6, 7, 8, 9, 10, 11, 12, 13, 14, 15, 16, 17, and 18.

It has been found, surprisingly, that, even in this high lanthanide content system, zinc oxide is effective in assisting the ion exchange process as is known for conventional ophthalmic glasses. (See, e.g., U.S. Pat. No. 4,012,131.) When less than 0.1 mole % is included, the resultant chemstrengthenability is less preferred. In addition, devitrification increases and chemical durability is lowered. Preferably, the amount of ZnO is at least 0.2 mole %. When amounts of ZnO greater than 10 mole % are included, unsatisfactory phase separation occurs. Other end point limits for ZnO include 1, 2, 3, 4, 5, 6, 7, 8, 9 and 10 mole %.

It is also important that the amount of $K_2O$ be 0–4 mole %. If an amount greater than 4 mole % is included, the chemstrengthening process is adversely affected. For example, the modulus of rupture (MOR (nm/cm)) becomes worse. Alternative end point limits for $K_2O$ include 0.5, 1, 1.5, 2, 2.5, 3, 3.5 and 4 mole %.

Similarly, if the amounts of CaO, BaO, or SrO exceed 3 mole %, there will be an adverse influence on the chemstrengthenability of the glass by interference effects during the chemstrengthening process. For example, depth of layer (DOL (μm)) and/or MOR worsen. It has been noted, however, that at higher CaO contents in this range, the adverse effects on the ion exchange process can be offset by the addition of relatively larger amounts of ZnO and/or MgO within the ranges given herein. Alternative end points for each of these components include 0.5, 1, 1.5, 2, 2.5, and 3 mole %.

Amounts of MgO greater than 3 mole % cause an unfavorable increase in the melting temperature. Alternative end point limits for MgO include 0.5, 1, 1.5, 2, 2.5, and 3 mole %.

Inclusion in the glasses of this invention of amounts of PbO greater than 4 mole % also will cause unacceptable effects interfering with the chemstrengthening process, e.g., worsening DOL and/or MOR. Alternative end point limits for this ingredient include 0, 0.5, 1, 1.5, 2, 2.5, 3, 3.5 and 4 mole %. In glasses including $CeO_2$, Ti-Ce and Pb-Ce can form a color center which will shift some of the color effects. Where these effects are unacceptable, of course, less Ti and less Pb, respectively, should be employed within the range of this invention.

Amounts of $Li_2O$ greater than 4 mole % cause undesirable crystallization of the glass, i.e., devitrification instability. Alternative end point limits for this component include 0.5, 1, 1.5, 2, 2.5, 3, 3.5 and 4 mole %. Preferably, less than 3 mole % is included. The tolerable amount of $Li_2O$ without unacceptable devitrification generally increases as the atomic number of the lanthanide increases.

Amounts of $Al_2O_3$ greater than 7 mole percent cause unacceptable melting difficulties. Alternative end point limits for this glass component include 1, 2, 3, 4, 5, 6, and 7 mole %.

Considering refining properties only, the total amount of the refining agents $As_2O_3$ and/or $Sb_2O_3$ should be at most 0.4 mole %. An especially preferred amount is about 0.3 mole %.

When amounts of the network former $SiO_2$ less than about 54 mole % are included, unacceptable devitrification occurs. When amounts greater than 75 mole % are included, maximum Ln content and/or chemstrengthenability are adversely affected. Alternative end point limits for this ingredient include 54, 55, 56, 57, 58, 59, 60, 61, 62, 63, 64, 65, 66, 67, 68, 69, 70, 71, 72, 73, 74 and 75 mole %.

When amounts of the lanthanide oxide less than 3 mole % are included, unsatisfactory filtering is achieved. When amounts greater than 7 mole % are included, devitrification is unacceptable. Alternative and point limits for this ingredient include 3, 3.5, 4, 4.5, 5, 5.5, 6, 6.5 and 7 mole %. Suitable lanthanides include La, Ce, Pr, Sm, Eu, Gd, Tb, Dy, Ho, Er, Tm and/or Yb. Also possible as a contemplated equivalent is uranium, typically in an amount up to 3 mole % (as $UO_2$), e.g., for use in solar panels. In general, as the atomic weight of lanthanide increases, the lanthanide content tolerable without unacceptable devitrification increases. Mixtures can be employed in the range of 3–7 mole % also. Such mixtures can also include Nd. Once a preferred base glass composition is determined for a desired use, the lanthanides can be interchanged to obtain desired property variations correlated with each lanthanide. Where necessary, total lanthanide content of the base composition can be maintained by additions of $La_2O_3$ to ensure composition property uniformity. As mentioned, Ce is useful to provide a wide range of tailorable UV/blue range attenuation properties in view of the wide content range possible.

In view of the Ln content of these glasses, they are particularly useful as filter glasses, i.e., optical glass elements that partially/fully absorb incident electromagnetic radiation in the ultraviolet, visible and/or infrared regions of the electromagnetic spectrum. This absorption is selective within the limits of the combinations of the incorporated absorbing species utilized. Appropriate filter compositions can be routinely designed by combining the lanthanides in various proportions and amounts corresponding to the absorbances desired. A list of primary absorption wavelengths for the various elements is shown in Table 2.

TABLE 2

| Lanthanide (Rare Earth) Oxide | Primary Absorption Wavelength(s) (nm) |
|---|---|
| $La_2O_3$ | U.V. region near intrinsic cut on |
| $CeO_2$ | 314 |
| $Pr_6O_{11}$ | 440, 469, 481, 588 |
| $Sm_2O_3$ | 374, 402, 470 |
| $Eu_2O_2$ | 392, 462 |
| $Gd_2O_3$ | 2750 |
| $Tb_2O_3$ | 380 |
| $Dy_2O_3$ | 345, 380, 452 |
| $Ho_2O_3$ | 361, 419, 445, 453, 460, 536, 638 |
| $Er_2O_3$ | 379, 408, 450, 492, 522, 660 |
| $Tm_2O_3$ | 360, 460, 480, 670 |
| $Yb_2O_3$ | 900–1030 |

The corresponding filters of this invention can be employed for all uses of such filters, e.g., as discussed above. Nonlimiting, exemplary uses for various combinations of lanthanides are given in Table 3.

TABLE 3

| Lanthanide Combination | Application |
|---|---|
| $CeO_2/Pr_6O_{11}/Nd_2O_3/Sm_2O_3/Er_2O_3$ | Color Enhancement Filter |
| $CeO_2/Sm_2O_3$ | Laser Cavity Filter |
| $CeO_2/Er_2O_3/Sm_2O_3$ | Laser Filter |
| $CeO_2/Ho_2O_3$ | Laser Filter |
| $CeO_2/Er_2O_3/Yb_2O_3$ | Laser Glass |
| $Eu_2O_3$ | Faraday Rotator |
| $CeO_2/Pr_6O_{11}/Nd_2O_3/Er_2O_3$ (with addition of $Fe_2O_3$ and NiO) | Specialty Sunglass |
| $CeO_2$ | Where U.V. attenuation is desired or solarization could be a potential problem (see applications listed above). |

When amounts of the fluxing agent $B_2O_3$ less than about 5 mole % are included, meltability is unacceptable. When amounts greater than about 17 mole % are included, phase separation occurs and devitrification is unacceptable. Alternative end point limits for this ingredient include 5, 6, 7, 8, 9, 10, 11, 12, 13, 14, 15, 16 and 17 mole %.

The minimum amount for effective UV attenuation (and/or solarization inhabitation) of $CeO_2$ is typically at least 0.05 mole %, preferably at least 0.25 mole %. When amounts of this UV-attenuator greater than 0.5 mole % are included, the maximum permissible amounts of the other desired Ln components is lowered. Alternative end point limits include 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 and 3.0 mole %. When Pb and/or Ti are also present in the glass, UV attenuation can also be achieved by Ce/Pb and/or Ce/Ti combinations.

For many applications of the glasses of this invention, additional colorants will not be desired; e.g., where the coloration caused by the lanthanide oxide content is satisfactory per se, then amounts of conventional colorants can still be included, as long as the amounts of each are less than those wherein each ingredient is effective as a major colorant. Typically, such amounts will be as follows for several conventional colorants:

TABLE 4

|  | Wt. %* |
| --- | --- |
| $Cr_2O_3$ | <0.005 |
| CuO | <0.02 |
| MnO | <0.02 |
| CoO | <0.0005 |
| $Fe_2O_3$ | <0.035 |
| NiO | <0.02 |
| $TiO_2$ | <5.0 |
| $V_2O_5$ | <0.02 |
| $Er_2O_3$ | <0.1 |

*Amounts generally too low for effective coloring effects, e.g., amounts permitted as impurities.

Of course, where the coloring effect of such conventional additives is desired, an effective amount greater than those stated above can routinely be employed. Typically, the upper limit on the amount of each colorant will be routinely chosen, e.g., for filter performance reasons with respect to the final color produced, as long as there is no adverse effect on the important properties of the glass of this invention. Typically, the total amount of all colorant additives will be less than 5 mole % unless indicated otherwise herein. Normally, this component will be exchanged for lanthanide on an ion-for-ion basis. Suitable colorants include those listed in Table 4. Their use to custom contour the spectral response of the glass is analogous to U.S. Pat. No. 4,769,347 and 4,521,524.

When the glasses of this invention are employed as filters, they are preferably shaped conventionally into a suitable form for use, e.g., as faceplates, plano/plano filter elements, prisms, etc. Other possible applications of the glasses of this invention include those mentioned above. When used as CRT filters, they, of course, will be designed for effecting spectral partitioning of the CRT's phosphor emission lines, e.g., typically P-22 and P-43. See, e.g., U.S. Pat. No. 4,769,347. These typically will contain $Nd_2O_3$ and a combination, optionally, of $Pr_6O_{11}$, $Er_2O_3$ and $Sm_2O_3$.

In view of the unique combination of ingredients given above, the glasses of this invention can be very well chemstrengthened using conventional techniques such as those mentioned in the Stroud and other references, above. Typically, a crown-bath solution can be used, e.g., 99.5 percent $KNO_3$ and 0.5 percent silicic acid, at a temperature in the range of about 480°-550° C. for an exchange time of, e.g., 16 hours or in the range of 8-24 hours. Typically, a preferred exchange temperature will be approximately 30° lower than the strain temperature of the glass. Determination of optimum chemstrengthening layer thicknesses can be effected routinely. Typically, acceptable thicknesses of a chemstrengthened layer will be in the range of above 30 μm, preferably about 50 μm; however, narrower and larger thicknesses are fully included. Typical surface compression values achievable are about 1600-2200 nm/cm.

Strengthening by physical tempering can also be very advantageously performed in conjunction with the glasses of this invention. A suitable procedure involves hot air blowing at about 700° C. to $T_g°$ C.+100° C., followed by room temperature air blowing for quenching. Typically, the hot air treatment lasts for about 2-3 minutes. A general rule of thumb for suitable conditions for air hardening is that temperatures should be above $T_g + 100°$ C. and hot air soak should continue for one minute for every mm of sample thickness.

The glasses of this invention can be prepared routinely by using normal batch components corresponding to the above-mentioned oxides, followed by conventional melting in an appropriate crucible, e.g., a platinum or quartz crucible, e.g., at melt temperatures of, for example, 1300°-1450° C.

Without further elaboration, it is believed that one of ordinary skill in the art can, utilizing the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire texts of all applications, patents, and publications, if any, cited above and below are hereby incorporated by reference.

TABLE 5

|  | Examples | | | | | |
| --- | --- | --- | --- | --- | --- | --- |
|  | 1 | 2 | 3 | 4 | 5 | 6 |
|  | Weight Percent Oxide | | | | | |
| $SiO_2$ | 51.77 | 51.93 | 49.58 | 47.57 | 43.86 | 59.94 |
| $B_2O_3$ | 6.93 | 6.95 | 6.64 | 6.37 | 6.35 | 7.27 |
| $Li_2O$ | — | — | — | — | 1.06 | — |
| $Na_2O$ | 12.68 | 12.72 | 12.15 | 11.65 | 10.14 | 13.30 |
| $K_2O$ | — | — | — | — | 3.34 | — |
| ZnO | 2.74 | 2.74 | 2.61 | 2.52 | 3.47 | 2.87 |
| $La_2O_3$ | — | — | — | — | — | — |
| $CeO_2$ | 0.50 | 0.50 | 0.48 | 0.46 | 0.46 | 0.53 |
| $Pr_6O_{11}$ | — | — | — | — | — | 4.55 |
| $Nd_2O_3$ | — | — | — | — | — | 13.52 |
| $Ho_2O_3$ | — | 25.15 | — | — | — | — |
| $Er_2O_3$ | 25.38 | — | 28.53 | 31.43 | 31.32 | — |
| $Fe_3O_4$ | — | — | — | — | — | 2.93 |
| NiO | — | — | — | — | — | 0.10 |
|  | Mole Percent Oxide | | | | | |
| $SiO_2$ | 67.92 | 67.92 | 67.30 | 66.70 | 61.70 | 68.74 |
| $B_2O_3$ | 7.85 | 7.85 | 7.78 | 7.71 | 7.71 | 7.85 |
| $LiO_2$ | — | — | — | — | 3.0 | — |
| $Na_2O$ | 16.13 | 16.13 | 15.98 | 15.84 | 13.84 | 16.13 |
| $K_2O$ | — | — | — | — | 3.0 | — |
| ZnO | 2.65 | 2.65 | 2.63 | 2.61 | 3.61 | 2.65 |
| $La_2O_3$ | — | — | — | — | — | — |
| $CeO_2$ | 0.23 | 0.23 | 0.23 | 0.23 | 0.23 | 0.23 |
| $Pr_6O_{11}$ | — | — | — | — | — | 0.335 |
| $Nd_2O_3$ | — | — | — | — | — | 3.02 |
| $Ho_2O_3$ | — | 5.23 | — | — | — | — |
| $Er_2O_3$ | 5.23 | — | 6.08 | 6.92 | 6.92 | — |
| $Fe_3O_4$ | — | — | — | — | — | 0.95 |
| NiO | — | — | — | — | — | 0.10 |
| Properties | | | | | | |
| $CTE_{20-300} \times 10^{-7}/°C.$ | 80.5 | — | 78.9 | 80.9 | 94.1 | 83.5 |
| $T_g$ °C. | 600° C. | — | 606 | 601 | 547 | 561 |
| S.P. °C. | 764° C. | — | 770 | 777 | 707 | 708 |

TABLE 5-continued

| | Examples | | | | | |
|---|---|---|---|---|---|---|
| | 1 | 2 | 3 | 4 | 5 | 6 |
| $n_d$ | 1.55 | 1.55 | 1.56 | 1.57 | 1.57 | 1.56 |
| Density gm/cm$^3$ | 3.08 | 3.09 | 3.17 | 3.26 | 3.34 | 2.92 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A high lanthanide, chemically strengthenable glass consisting essentially of, in mole percent

| | |
|---|---|
| SiO$_2$ | 54–75 |
| B$_2$O$_3$ | 5–17 |
| Li$_2$O | 0–4 |
| Na$_2$O | 3–18 |
| K$_2$O | 0–4 |
| Al$_2$O$_3$ | 0–7 |
| PbO | 0–4 |
| MgO | 0–3 |
| CaO | 0–3 |
| SrO | 0–3 |
| BaO | 0–3 |
| ZnO | 0.1–10 |
| TiO$_2$ | 0–5 |
| Ln$_2$O$_3$ | 3–7 |
| V$_2$O$_5$ + Cr$_2$O$_3$ + Mn$_2$O$_3$ | 0–5 |
| Fe$_2$O$_3$ + CoO + NiO + CuO | |
| As$_2$O$_3$/Sb$_2$O$_3$ | 0–0.4 | wherein Ln is La, Ce, Pr, Sm, Eu, Gd, Tb, Dy, Ho, Er, Tm and/or Yb.

2. A glass of claim 1, wherein when Ce is present, the amount thereof is 0–3 mole percent.

3. A glass of claim 2 consisting essentially of, in mole percent

| | |
|---|---|
| SiO$_2$ | 60–70 |
| B$_2$O$_3$ | 5–10 |
| Li$_2$O | 0–3.5 |
| Na$_2$O | 10–18 |
| K$_2$O | 0–3.5 |
| Al$_2$O$_3$ | 0 |
| PbO | 0 |
| MgO | 0 |
| CaO | 0 |
| SrO | 0 |
| BaO | 0 |
| ZnO | 1–7 |
| TiO$_2$ | 0 |
| Ln$_2$O$_3$ | 4–7 |
| V$_2$O$_5$ + Cr$_2$O$_3$ + Mn$_2$O$_3$ | 0 |
| Fe$_2$O$_3$ + CoO + NiO + CuO | |
| As$_2$O$_3$/Sb$_2$O$_3$ | 0–0.2 |

4. A glass of claim 2 consisting essentially of, in mole percent

| | |
|---|---|
| SiO$_2$ | 65–70 |
| B$_2$O$_3$ | 6–9 |
| Li$_2$O | 0–3 |
| Na$_2$O | 15–17 |
| K$_2$O | 0–3 |
| Al$_2$O$_3$ | 0 |
| PbO | 0 |
| MgO | 0 |
| CaO | 0 |
| SrO | 0 |
| BaO | 0 |
| ZnO | 2–5 |
| TiO$_2$ | 0 |
| Ln$_2$O$_3$ | 5–7 |
| V$_2$O$_5$ + Cr$_2$O$_3$ + Mn$_2$O$_3$ | 0 |
| Fe$_2$O$_3$ + CoO + NiO + CuO | |
| As$_2$O$_3$/Sb$_2$O$_3$ | 0–0.2 |

5. A glass of claim 2 having a MgO content.

6. A glass of claim 2 having a TiO$_2$ content.

7. A glass of claim 2, wherein the amount of ZnO is 2–5 mole %.

8. A glass of claim 2, wherein the amount of K$_2$O is 0–3.

9. A glass of claim 2, wherein the amounts of K$_2$O, CaO, BaO, SrO, and PbO are 0.

10. A glass of claim 2 having a chemically strengthened surface layer prepared by ion exchange.

11. A glass of claim 3 having a chemically strengthened surface layer prepared by ion exchange.

12. A glass of claim 4 having a chemically strengthened surface layer prepared by ion exchange.

13. A glass of claim 9 having a chemically strengthened surface layer prepared by ion exchange.

14. A high lanthanide, chemically strengthenable glass consisting essentially of, in mole percent

| | |
|---|---|
| SiO$_2$ | 54–75 |
| B$_2$O$_3$ | 5–17 |
| Li$_2$O | 0–4 |
| Na$_2$O | 3–18 |
| K$_2$O | 0–4 |
| Al$_2$O$_3$ | 0–7 |
| PbO | 0–4 |
| MgO | 0–3 |
| CaO | 0–3 |
| SrO | 0–3 |
| BaO | 0–3 |
| ZnO | 0.1–10 |
| TiO$_2$ | 0–5 |
| Ln$_2$O$_3$ | 3–7 |
| V$_2$O$_5$ + Cr$_2$O$_3$ + Mn$_2$O$_3$ | 0–5 |
| Fe$_2$O$_3$ + CoO + NiO + CuO | |
| As$_2$O$_3$/Sb$_2$O$_3$ | 0–0.4 |
| CeO$_2$ | 0–3 | wherein Ln is La, Pr, Sm, Eu, Gd, Tb, Dy, Ho, Er, Tm and/or Yb.

15. A glass of claim 14 consisting essentially of, in mole percent

| | |
|---|---|
| SiO$_2$ | 60–70 |
| B$_2$O$_3$ | 5–10 |
| Li$_2$O | 0–3.5 |
| Na$_2$O | 10–18 |
| K$_2$O | 0–3.5 |
| Al$_2$O$_3$ | 0 |
| PbO | 0 |
| MgO | 0 |
| CaO | 0 |
| SrO | 0 |
| BaO | 0 |
| ZnO | 1–7 |
| TiO$_2$ | 0 |
| Ln$_2$O$_3$ | 4–7 |
| V$_2$O$_5$ + Cr$_2$O$_3$ + Mn$_2$O$_3$ | 0 |
| Fe$_2$O$_3$ + CoO + NiO + CuO | |
| As$_2$O$_3$/Sb$_2$O$_3$ | 0–0.2 |

-continued

| | |
|---|---|
| CeO$_2$ | 0–2 |

16. A glass of claim 14 consisting essentially of, in mole percent

| | |
|---|---|
| SiO$_2$ | 65–70 |
| B$_2$O$_3$ | 6–9 |
| Li$_2$O | 0–3 |
| Na$_2$O | 15–17 |
| K$_2$O | 0–3 |
| Al$_2$O$_3$ | 0 |
| PbO | 0 |
| MgO | 0 |
| CaO | 0 |
| SrO | 0 |
| BaO | 0 |
| ZnO | 2–5 |
| TiO$_2$ | 0 |
| Ln$_2$O$_3$ | 5–7 |
| V$_2$O$_5$ + Cr$_2$O$_3$ + Mn$_2$O$_3$ | 0 |
| Fe$_2$O$_3$ + CoO + NiO + CuO | |
| As$_2$O$_3$/Sb$_2$O$_3$ | 0–0.2 |
| CeO$_2$ | 0–1.5 |

17. A glass of claim 14 having a MgO content.
18. A glass of claim 14 having a TiO$_2$ content.
19. A glass of claim 14, wherein the amount of ZnO is 2–5 mole %.
20. A glass of claim 14, wherein the amount of K$_2$O is 0–3.
21. A glass of claim 14, wherein the amounts of K$_2$O, CaO, BaO, SrO, and PbO are 0.
22. A glass of claim 14 having a chemically strengthened surface layer prepared by ion exchange.
23. A glass of claim 15 having a chemically strengthened surface layer prepared by ion exchange.
24. A glass of claim 16 having a chemically strengthened surface layer prepared by ion exchange.
25. A glass of claim 21 having a chemically strengthened surface layer prepared by ion exchange.
26. An optical filter element consisting essentially of a glass of claim 10 in the form of a filter.
27. A UV-attenuated filter element consisting essentially of a glass of claim 22 in the form of a filter.
28. A glass of claim 2 containing more than one Ln.
29. A glass of claim 14 containing more than one Ln.
30. A glass of claim 2 having a strengthened surface layer prepared by heat treatment of a surface followed by quenching.
31. A glass of claim 14 having a strengthened surface layer prepared by heat treatment of a surface followed by quenching.
32. A method of chemically strengthening a surface of a silicate glass containing 3–7 mole % of a lanthanide oxide other than Nd$_2$O$_3$ or of a mixture of said lanthanides with each other and/or with Nd$_2$O$_3$ and 3–18 mole % of Na$_2$O comprising chemstrengthening such a silicate glass having a composition further consisting essentially of 0.1–10 wt. % ZnO and less than 3 wt. % of each of K$_2$O, PbO, CaO, BaO, and SrO.
33. A glass of claim 2 further containing up to 3 wt. % of UO$_2$ in addition to or as a replacement for Ln$_2$O$_3$.
34. A glass of claim 1, wherein Ln is Sm, Eu, Gd, Tb, Dy, Ho, Er, Tm and/or Yb.
35. A glass of claim 1, wherein Ln is Ho, Er or Sm.
36. A glass of claim 1, consisting essentially of, in mole %:

| | |
|---|---|
| PbO | 0–2 |
| CaO | 0–2 |
| SrO | 0–2 |
| BaO | 0–2 |

* * * * *